(12) United States Patent
Wolff et al.

(10) Patent No.: US 8,490,726 B2
(45) Date of Patent: *Jul. 23, 2013

(54) POWER GENERATION SYSTEM AND METHOD FOR ASSEMBLING THE SAME

(75) Inventors: Bruce Ernest Richard Wolff, Livonia, MI (US); Douglas Edwin Berry, St. George, UT (US); Mark Daniel Bowdich, Berkley, MI (US); Gerhard Kramer, Pluederhausen (DE); Scott Daniel Woodruff, Farmington Hills, MI (US)

(73) Assignee: Tognum America Inc., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/427,573

(22) Filed: Mar. 22, 2012

(65) Prior Publication Data
US 2012/0184380 A1 Jul. 19, 2012

Related U.S. Application Data

(63) Continuation of application No. 12/470,209, filed on May 21, 2009, now Pat. No. 8,167,062.

(51) Int. Cl.
*B60K 6/20* (2007.10)

(52) U.S. Cl.
USPC ............... 180/65.21; 180/65.245; 903/905; 903/951

(58) Field of Classification Search
USPC ....... 180/298, 65.21, 65.245, 65.31; 290/1 C; 903/905, 909, 912, 951
See application file for complete search history.

(56) References Cited

U.S. PATENT DOCUMENTS

| 3,289,781 | A |   | 12/1966 | Ferguson |
|-----------|---|---|---------|----------|
| 3,362,352 | A | * | 1/1968  | Cripe et al. ............ 105/49 |
| 3,673,813 | A |   | 7/1972  | Wright |
| 3,791,169 | A | * | 2/1974  | Wright ............ 464/24 |
| 4,095,665 | A |   | 6/1978  | Armfield |
| 4,282,947 | A |   | 8/1981  | Kemper |
| 4,432,739 | A |   | 2/1984  | Walter |
| 4,570,077 | A |   | 2/1986  | Lambley |
| 4,928,635 | A |   | 5/1990  | Shelor |
| 5,492,311 | A |   | 2/1996  | Kurr et al. |
| 5,582,262 | A |   | 12/1996 | Wust |

(Continued)

FOREIGN PATENT DOCUMENTS

| EP | 0666192 A1 | 8/1995 |
|----|------------|--------|
| EP | 1172525 A1 | 1/2002 |

OTHER PUBLICATIONS

Geislinger GmbH, 5300 Hallwang, Austria Gesilco Catalog: Version 6.1; Geislinger Couplings and Dampers, 55 pages.

(Continued)

*Primary Examiner* — Joseph Rocca
*Assistant Examiner* — Timothy Wilhelm
(74) *Attorney, Agent, or Firm* — Honigman Miller Schwartz and Cohn LLP

(57) ABSTRACT

A power generation system is disclosed. The power generation system includes an electrical converting device and a repowered portion connected to the electrical converting device. The repowered portion includes a reciprocating internal combustion engine and a gearbox. The reciprocating internal combustion engine is connected to the gearbox by a first connecting structure. The gearbox is connected to the electrical converting device by a second connecting structure.

47 Claims, 5 Drawing Sheets

U.S. PATENT DOCUMENTS

| | | | |
|---|---|---|---|
| 5,975,227 | A | 11/1999 | Vlad |
| 6,105,697 | A | 8/2000 | Weaver |
| 6,478,100 | B1 | 11/2002 | Grewe |
| 7,108,095 | B1 | 9/2006 | Washington et al. |
| 7,361,069 | B2 | 4/2008 | Mansfield et al. |
| 7,384,371 | B2 | 6/2008 | Liebl et al. |
| 7,462,121 | B2 | 12/2008 | Janson et al. |
| 7,597,164 | B2 | 10/2009 | Severinsky et al. |
| 7,841,433 | B2 | 11/2010 | Soliman et al. |
| 2003/0183467 | A1 | 10/2003 | Kozarekar |
| 2004/0112654 | A1 | 6/2004 | Kozarekar et al. |
| 2004/0168657 | A1* | 9/2004 | Gooijer .................. 123/78 F |
| 2004/0204286 | A1 | 10/2004 | Stridsberg |
| 2007/0049379 | A1 | 3/2007 | Faass et al. |
| 2007/0145745 | A1 | 6/2007 | Woods et al. |
| 2008/0314661 | A1 | 12/2008 | Soliman et al. |
| 2009/0127930 | A1 | 5/2009 | Senda |
| 2009/0171523 | A1 | 7/2009 | Luo et al. |
| 2010/0240491 | A1 | 9/2010 | Vyas et al. |

OTHER PUBLICATIONS

International Search Report for PCT/US2010/035504 dated Dec. 2, 2010.
Electro-Motive Division, General Motors Corporation "Maintenance Instruction"; AR10-D14 Traction Generator (19 pages).
Cotta Transmission Company, "Locomotive Repower", Application Sheet (6 pages).
Office Action dated Jun. 2, 2011 for U.S. Appl. No. 12/470,209.
Office Action dated Oct. 14, 2011 for U.S. Appl. No. 12/470,209.

\* cited by examiner

POWER GENERATION SYSTEM AND METHOD FOR ASSEMBLING THE SAME

REFERENCE TO RELATED APPLICATIONS

This U.S. patent application is a continuation application of U.S. Ser. No. 12/470,209 filed on May 21, 2009, now U.S. Pat. No. 8,167,062 issued on May 1, 2012. The disclosure of this prior application is considered part of the disclosure of this application and are hereby incorporated by reference in their entirety.

TECHNICAL FIELD

The invention relates to a power generation system and to a method for assembling the same.

BACKGROUND

It is known in the art that some types of industrial vehicle applications (e.g., locomotives, marine vessels and the like) may utilize a reciprocating internal combustion engine for propelling the vehicle. Further, it is known in the art that an electrical converting device (e.g., a traction alternator/traction generator) may be connected to and be driven by the reciprocating internal combustion engine.

Although conventional industrial vehicle applications including an arrangement of a reciprocating internal combustion engine and electrical converting device have proven to be useful, there have been efforts to "repower" such conventional industrial vehicle applications. "Repowering" a conventional industrial vehicle application usually includes the removal and subsequent replacement of an originally-installed/older/less efficient/"higher emission" reciprocating internal combustion engine with a new reciprocating internal combustion engine. The intent of providing the new reciprocating internal combustion engine may be, for example, to provide a "cleaner"/more efficient industrial vehicle application when compared to other industrial vehicle applications including an originally-installed/older/less efficient/"high emission" reciprocating internal combustion engine.

However, it has been recognized that "repowering" industrial vehicles may undesirably introduce several structural and/or performance-related concerns such that the usefulness and/or benefits to be realized by a "repowered" industrial vehicle application may be otherwise limited or prevented. Therefore, a need exists in the art for a power generation system and method for assembling the same in relation to "repowered" industrial vehicle applications.

BRIEF DESCRIPTION OF THE DRAWINGS

The disclosure will now be described, by way of example, with reference to the accompanying drawings, in which.

DETAILED DESCRIPTION

The Figures illustrate an exemplary embodiment of a novel power generation system and method for assembling the same in accordance with an embodiment of the invention. Based on the foregoing, it is to be generally understood that the nomenclature used herein is simply for convenience and the terms used to describe the invention should be given the broadest meaning by one of ordinary skill in the art.

Regarding the Power Generation System 20

Figure 1A:
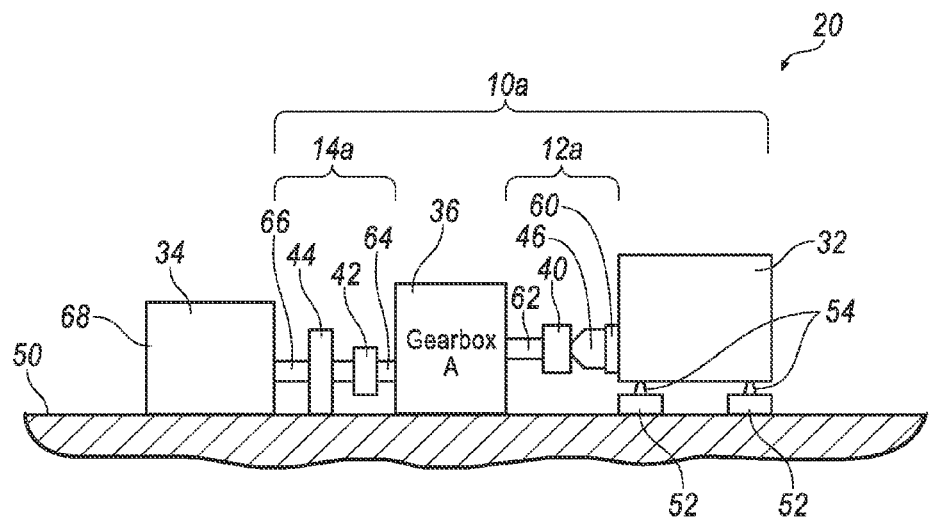
FIG. 1A is a schematic diagram of a power generation system in accordance with an embodiment of the invention.

Referring to FIG. 1A, a power generation system is shown generally at 20 in accordance with an embodiment of the invention. In an embodiment, the power generation system 20 includes a reciprocating internal combustion engine 32 (e.g. a diesel engine), a gearbox 36, and an electrical converting device 34 (i.e., a device that converts mechanical energy at an input 66 into electrical energy at an output 68). In an embodiment, the electrical converting device may include, for example, a traction alternator or a traction generator. In an embodiment, the power generation system 20 includes a first connecting structure 12a that connects the reciprocating internal combustion engine 32 and the gearbox 36, and, in an embodiment, the power generation system 20 includes a second connecting structure 14a that connects the gearbox 36 to the electrical converting device 34.

In an embodiment, the reciprocating internal combustion engine 32, electrical converting device 34 and gearbox 36 are mounted to a support frame 50 of an industrial vehicle (e.g., a locomotive, marine vessel or the like). In an embodiment, the electrical converting device 34 is an originally-installed component, and, the reciprocating internal combustion engine 32 is not an originally-installed component, but rather, a replacement component that may be "cleaner" and/or defined by an increased efficiency when compared to an originally-installed reciprocating internal combustion engine (not shown) that has been removed from the support frame 50.

Because the reciprocating internal combustion engine 32 may not be "immediately compatible" with the electrical converting device 34, the gearbox 36 and first and second connecting structure 12a, 14a may be introduced in order to permit the reciprocating internal combustion engine 32 to functionally cooperate with the electrical converting device 34. Accordingly, a combination of one or more of the reciprocating internal combustion engine 32, gearbox 36 and first and second connecting structure 12a, 14a may be referred to as a repowered portion 10a of the power generation system 20.

Regarding the Gearbox 36

Because the reciprocating internal combustion engine 32 is not an originally-installed component, it is likely that the maximum rated speed of the reciprocating internal combustion engine 32 is not the same as the maximum rated speed of the electrical converting device 34. As such, in an embodiment, the gearbox 36 is introduced for transmitting power from the reciprocating internal combustion engine 32 to the electrical converting device 34 but also to substantially match the maximum rated speed of the reciprocating internal combustion engine 32 to that of the electrical converting device 34.

For example, in an embodiment, both of the electrical converting device 34 and the originally-installed reciprocating internal combustion engine (not shown) may each include a similar maximum rated speed of, for example, 900 RPM. However, in an embodiment, the reciprocating internal combustion engine 32 that replaces the originally-installed reciprocating internal combustion engine may include a maximum rated speed of, for example, 1800 RPM; as such, the selected gearbox 36 for inclusion with the repowered portion 10a is characterized by specific gear ratio (e.g., a 2:1 gear ratio in view of the exemplar maximum rated speeds of 1800 RPM and 900 RPM described above) in order to match the maximum rated speed of the reciprocating internal combustion engine 32 with that of the electrical converting device 34.

Further, in an embodiment, it will be appreciated that the gearbox 36 shown in FIGS. 1A-1D is identified as "Gearbox A." In an embodiment, "Gearbox A" may be characterized as any gearbox that does not include a clutch, an overrunning clutch, fluid coupling or a torque converter for selectively translating rotational movement. However, "Gearbox A" may be characterized to include gears that are sized accordingly such that "Gearbox A" may withstand loads arising from the output device 60 (e.g., a flywheel) of the reciprocating internal combustion engine 32 when the reciprocating internal combustion engine 32 is subjected to what is commonly referred to in the art as "torque reversal" (i.e., as the engine continues to rotate in the forward direction, there are instances where the engine stops transmitting torque to the driven device, and, for a brief instant, the inertia of the driven device is providing torque to the reciprocating internal combustion engine; because of this, a clearance between the gear teeth is formed, and, when the torque becomes positive again, the gears may collide with one another). It will be appreciated that a torque reversal may also be characterized as, but not limited to, a torque pulse, torque vibration or other such short-duration variation in the transmitted torque, wherein the magnitude of the reduction of torque caused by the torque pulse, torque vibration or other such short-duration variation in the transmitted torque exceeds the average magnitude of the transmitted torque for a brief instant. Consequently, during that brief instant, the direction in which the instantaneous torque acts is the opposite of the direction in which the average transmitted torque acts. As such, in one example, "Gearbox A" may be characterized to include sufficiently increased contact area between the gears in order to withstand the loads produced by reciprocating internal combustion engine 32 during "torque reversal." It will be appreciated that the above-described example for strengthening the gears of "Gearbox A" is an embodiment of the invention and should not be construed to limit the scope or intended function of "Gearbox A."

Further, in an embodiment, the gearbox 36 (as well as the gearboxes 136, 236 described in the foregoing disclosure) may include an idler gear (not shown). In an embodiment, the idler gear permits the gearbox output 64 to rotate in the same direction as the gearbox input 62 so that the rotor of the electrical converting device 34 may rotate in the same direction that it would have rotated before introducing the repowered portion 10a (i.e., the implementation of the idler gear would obviate the re-orientation of any brushes on the rotor slip-rings in an alternator, and, the implementation of the idler gear would also allow for the reuse of a DC generator found in older locomotives or other industrial vehicles that include such a DC generator instead of an alternator).

Regarding the First Connecting Structure 12a

Further, as will be described in the foregoing disclosure, it will be appreciated that one or more components of the first and second connecting structure 12a, 14a may accommodate at least some relative motion between the reciprocating internal combustion engine 32 and the gearbox 36 and/or between the gearbox 36 and the electrical converting device 34, which may result from the operation of the industrial vehicle.

Functionally, the first connecting structure 12a is a mechanical connection that permits the reciprocating internal combustion engine 32 to transmit power to the gearbox 36. In an embodiment, the first connecting structure 12a includes a first misalignment coupling 40 connected to a torsionally resilient coupling 46. Further, the torsionally resilient coupling 46 is connected to an output device 60 (e.g., a flywheel) of the reciprocating internal combustion engine 32, and, the misalignment coupling 40 is connected to a gearbox input 62 (e.g., a gearbox input shaft) of the gearbox 36. As such, in an embodiment, the first connecting structure 12a may be said to include the output device 60, the torsionally resilient coupling 46, the misalignment coupling 40 and the gearbox input 62.

In an embodiment, the first misalignment coupling 40 and the torsionally resilient coupling 46 are located between the reciprocating internal combustion engine 32 and the gearbox 36 for connecting the output device 60 of the reciprocating internal combustion engine 32 to the gearbox input 62 of the gearbox 36. Functionally, the combination of the first misalignment coupling 40 and the torsionally resilient coupling 46 transmits the rotational movement of the output device 60 of the reciprocating internal combustion engine 32 to the gearbox input 62 of the gearbox 36. Further, the torsionally resilient coupling 46 may be functionally used as a "rotating shock absorber" that damps torque pulses/vibrations produced by the reciprocating internal combustion engine 32 in order to provide a smoother torque profile to the driven equipment (e.g., the gearbox 36, and, ultimately, the electrical converting device 34). Further, the first misalignment coupling 40 may also be functionally used to accommodate at least some relative motion that occurs between a resiliently mounted reciprocating internal combustion engine 32 (see, e.g., supports 52 and resilient mounts 54 described below) and a rigidly mounted gearbox 36 when, for example, the support frame 50 undergoes bending or twisting during vehicle operation, or, for example, during 'shock accelerations' if, for example, a locomotive hits a string of railway cars at too high of a speed (e.g., five miles-per-hour).

In an embodiment, the torsionally resilient coupling 46 may be an all-steel coupling that is damped by pressurized oil supplied by the reciprocating internal combustion engine 32. In an embodiment, the torsionally resilient coupling 46 may be commercially available from GEISLINGER®. It will be appreciated, however, that the torsionally resilient coupling 46 is not limited to an all-steel embodiment and that the torsionally resilient coupling 46 may include a rubber or silicone material; in an embodiment, a rubber or silicone torsionally resilient coupling 46 may be commercially available from VULKAN® and sold under the trade-name VULASTIK®, or, alternatively, a rubber or silicone torsionally resilient coupling 46 may be commercially available from CENTA® and sold under the trade-names CENTAFLEX® or CENTAMAX®.

In an embodiment, the first misalignment coupling 40 may include a "Gesilco Butterfly" misalignment coupling commercially available from GEISLINGER®, which has a high torque capacity in a relatively compact length and is virtually maintenance-free due to a carbon-fiber construction. It will be appreciated, however, that the first misalignment coupling 40 is not limited to a GESILCO® misalignment coupling and that any type of coupling accommodating at least some relative motion may be used as an alternative to the GESILCO® misalignment coupling.

Regarding the Second Connecting Structure 14a

Functionally, the second connecting structure 14a is a mechanical connection that permits the gearbox 36 to transmit power originating from the reciprocating internal combustion engine 32 to the electrical converting device 34. In an embodiment, the second connecting structure 14a includes a second misalignment coupling 42 that connects a gearbox output 64 (e.g. a gearbox output shaft) of the gearbox 36 to an input 66 (i.e., a driven end of a rotor) of the electrical converting device 34.

In an embodiment, the second misalignment coupling 42 may functionally transmit the rotation of the gearbox output 64 of the gearbox 36 to the input 66 of the electrical converting device 34. Further, the second misalignment coupling 42 may be functionally used to accommodate relative motion occurring between the rigidly mounted gearbox 36 and the rigidly mounted electrical converting device 34 when the support frame 50 undergoes bending or twisting during vehicle operation.

In an embodiment, the second misalignment coupling 42 may include a "Gesilco Butterfly" misalignment coupling commercially available from GEISLINGER®, which is substantially similar to the first misalignment coupling 40 described above. As such, it will be appreciated that the second misalignment coupling 42 may be characterized to have a high torque capacity and a high misalignment capacity in a relatively compact length as well as being virtually maintenance-free due to a carbon-fiber construction. It will be appreciated, however, that the second misalignment coupling 42 is not limited to a GESILCO® butterfly-style misalignment coupling and that any type of coupling that possesses the characteristics discussed above may be used as an alternative to the GESILCO® butterfly-style misalignment coupling.

Regarding the Support 44

In an embodiment, the second connecting structure 14a may also include a support 44 that supports the driven end or input 66 of the rotor of the electrical converting device 34. In an embodiment, the support 44 may functionally align the rotor of the electrical converting device 34 with the stator of the electrical converting device 34. In an embodiment, the support 44 is rigidly mounted to the support frame 50.

In an embodiment, the support 44 may be included in the design of the second connecting structure 14a if, for example, the electrical converting device 34 is characterized to include a "single bearing" structure that is intended to support only the free end of the rotor of the electrical converting device 34. As such, the support 44 may be included in order to function as a "second bearing" that assists the electrical converting device 34 in the supporting the driven end or input 66 of its rotor. However, if, for example, the electrical converting device 34 is characterized to include a "double bearing" structure, it will be appreciated that the support 44 may be omitted from the design of the second connecting structure 14a due to the fact that the electrical converting device 34 includes first and second bearings that support the driven end or input 66 of the rotor as well as the free end of the rotor.

Regarding a Resilient Mounting of the Reciprocating Internal Combustion Engine 32

In an embodiment, the power generation system 20 may also include one or more supports 52 connected to the support frame 50 and one or more resilient mounts 54 that resiliently connect the reciprocating internal combustion engine 32 to the one or more supports 52. Functionally, the resilient mounting of the reciprocating internal combustion engine 32 provides the following benefits: a) protection of reciprocating internal combustion engine 32 from bending and twisting arising from the support frame 50, b) protection of the reciprocating internal combustion engine 32 from 'shock accelerations' arising from the support frame 50 due to, in the example of a locomotive, imperfections in the rail track structure and/or 'hard couplings' associated with stationary railcars, and c) avoiding the transmission of engine-produced noise and vibration from the reciprocating internal combustion engine 32 to the support frame 50. Comparatively, in an embodiment, the gearbox 36 is shown to be rigidly mounted to the support frame 50; however, as explained in the foregoing disclosure at FIGS. 1C-1D, it will be appreciated that the gearbox 36 is not limited to a rigid mounting configuration and that the gearbox 36 may also be resiliently mounted to the support frame 50. Further, comparatively, it will be appreciated that because the electrical converting device 34 is an originally-installed component, the electrical converting device 34 remains rigidly mounted to the support frame 50.

In an embodiment, the reciprocating internal combustion engine 32 may be mounted to the one or more supports 52 and one or more resilient mounts 54 for functionally elevating the reciprocating internal combustion engine 32 away from the support frame 50 in order to permit the crankshaft of the reciprocating internal combustion engine 32 to be aligned with the gearbox input 62 (in view of the alignment of the gearbox output 64 with that of the input 66 of the electrical converting device 34). In view of the above description pertaining to the alignment of the components of the present invention, it will be appreciated that illustrated embodiments in the present disclosure should not be meant to limit the scope of the invention. For example, in some illustrated embodiments, although the gearbox input 62 and gearbox output 64 may substantially include the same elevation relative the support frame 50 (see, e.g., FIGS. 1B, 2B), the supports 52, 54 may be included in the design of such power generation systems in order to realize the functional benefits arising from the resilient mounting configuration of the reciprocating internal combustion engine 32 described above. As such, it will be appreciated that the supports 52, 54 are not limited to a particular function (elevation compensation, resilient mounting, or the like) and may be included in the design of the invention to accomplish any number of functions.

In an embodiment, the one or more supports 52 may be attached to the support frame 50 by any desirable connection such as, for example, a welded connection. Further, in an embodiment, the one or more supports 52 may include a plurality of individual members, as illustrated, or, alternatively, one or more parallel elongated members that are substantially equal to a geometry (e.g., a length) of the reciprocating internal combustion engine 32.

Regarding the Power Generation System 120

Figure 1B:
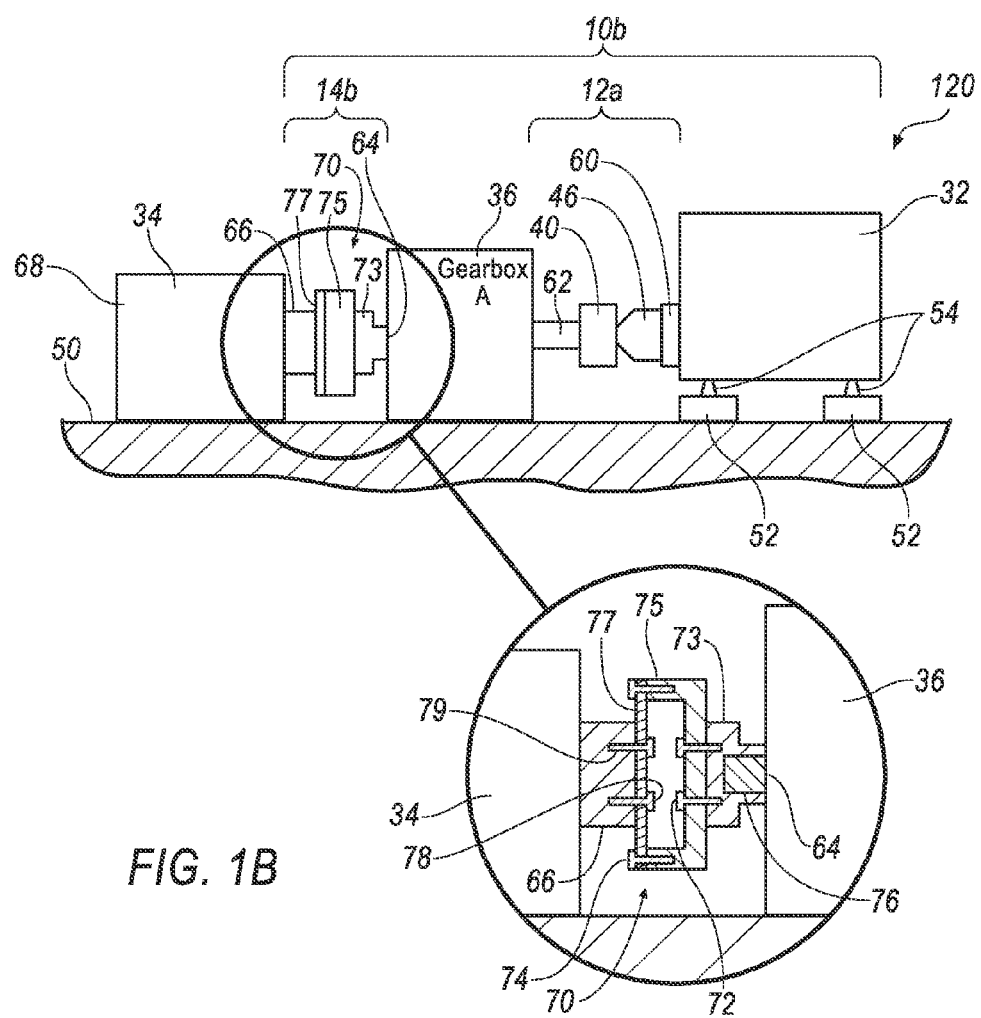
FIG. 1B is a schematic diagram of a power generation system in accordance with an embodiment of the invention.
Figure 2A:
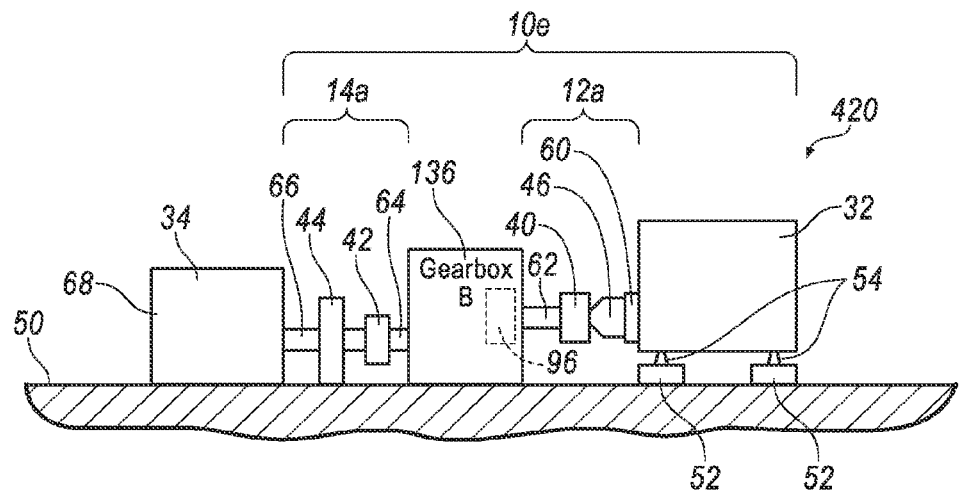
FIG. 2A is a schematic diagram of a power generation system in accordance with an embodiment of the invention.
Figure 2B:
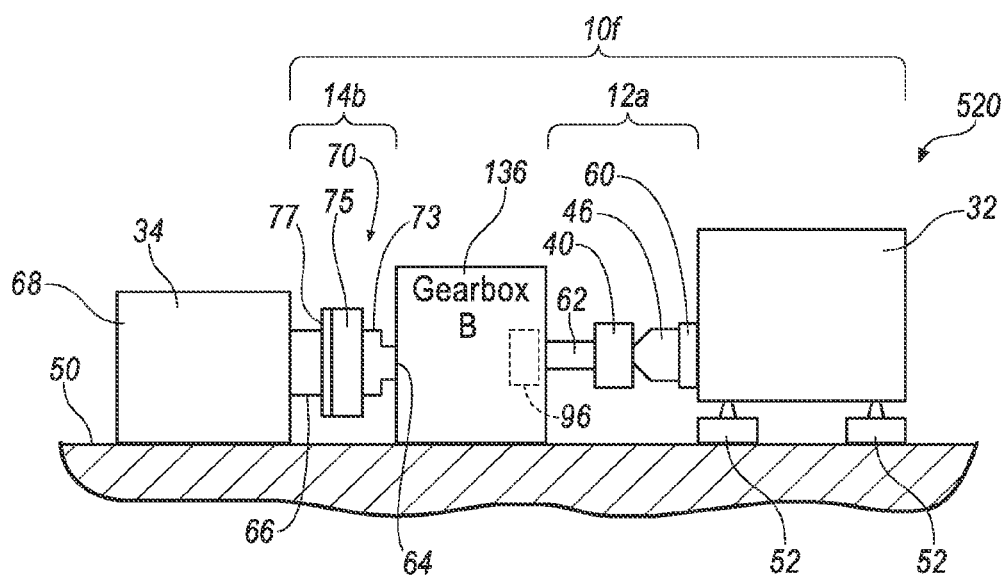
FIG. 2B is a schematic diagram of a power generation system in accordance with an embodiment of the invention.
Figure 2C:
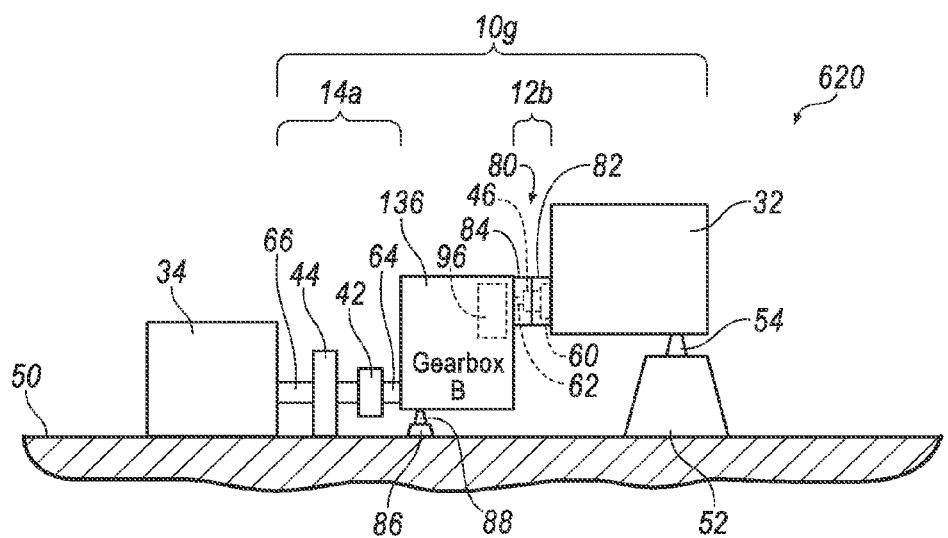
FIG. 2C is a schematic diagram of a power generation system in accordance with an embodiment of the invention.
Figure 2D:
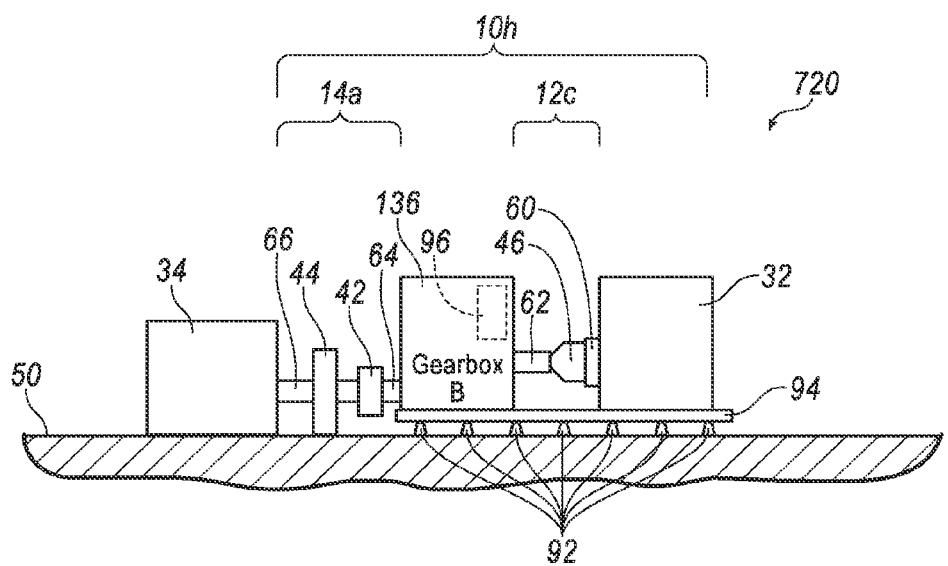
FIG. 2D is a schematic diagram of a power generation system in accordance with an embodiment of the invention.

Referring to FIG. 1B, a power generation system is shown generally at 120 having a repowered portion 10b in accordance with an embodiment of the invention. Comparatively, the repowered portion 10b is substantially similar to the repowered portion 10a shown in FIG. 1A except for the arrangement of the second connecting structure, which is shown generally at 14b.

In an embodiment, the second connecting structure 14b may be characterized as a direct power transmitting connection 70 including a hub member 73 connected to a rigid circular disk 75 by a first plurality of fasteners 72 (e.g., bolts)

and a flexible circular disk (e.g., a flexplate) 77 connected to the input 66 (i.e., a driven end of a rotor) by a second plurality of fasteners 78. The flexible circular disk 77 is then connected to the rigid circular disk 75 by a third plurality of fasteners 74 (e.g., bolts). In an embodiment, the hub member 73 may include a recess 76 to permit insertion and subsequent connection of the gearbox output 64 with the hub member 73.

Functionally, the second connecting structure 14b is a mechanical connection that permits the gearbox 36 to transmit power originating from the reciprocating internal combustion engine 32 to the electrical converting device 34. Further, it will be appreciated that the direct power transmitting connection 70 of the second connecting structure 14b may accommodate at least some of the axial misalignment and the relative movement occurring between the input 66 of the electrical converting device 34 and the gearbox output 64. Even further, it will be appreciated that because the support 44 and second misalignment coupling 42 are omitted from the design of the second connecting structure 14b, the gearbox 36 may be characterized to include a stronger gearbox outer housing and larger bearings.

Regarding the Power Generation System 220

Figure 1C:
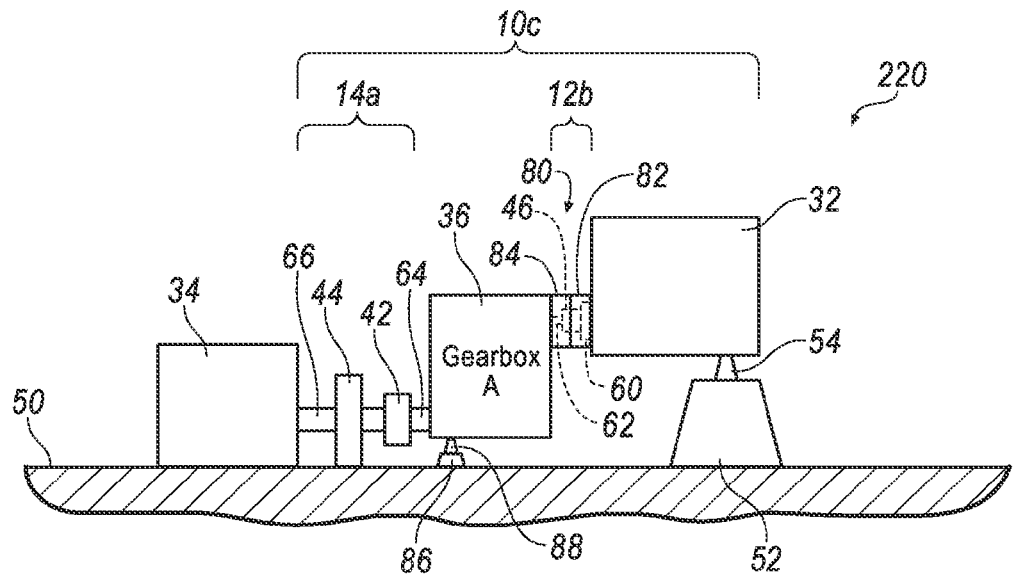
FIG. 1C is a schematic diagram of a power generation system in accordance with an embodiment of the invention.

Referring to FIG. 1C, a power generation system is shown generally at 220 having a repowered portion 10c in accordance with an embodiment of the invention. Comparatively, the repowered portion 10c is substantially similar to the repowered portion 10a shown in FIG. 1A except for the arrangement of the first connecting structure, which is shown generally at 12b. Further, the repowered portion 10c is differentiated from the repowered portion 10a shown in FIG. 1A due to the resilient mounting of the gearbox 36 with respect to the support frame 50 (i.e., the gearbox 36 is rigidly mounted to the support frame 50 in FIG. 1A); as such, it will be appreciated that the first misalignment coupling 40 may be omitted from the design of the first connecting structure 12b because both of the reciprocating internal combustion engine 32 and gearbox 36 are resiliently mounted. Yet even further, in an embodiment, the repowered portion 10c is differentiated from the repowered portion 10a shown in FIG. 1A in that the second misalignment coupling 42 may allow for a larger range of motion arising from the resilient mounting of the gearbox 36 as well as for the bending and twisting of the support frame 50.

In an embodiment, the first connecting structure 12b may be characterized as a flanged connection 80 having a torsionally resilient coupling 46. Further, in an embodiment, this flanged connection 80 possesses the function of rigidly connecting the reciprocating internal combustion engine 32 to the gearbox 36, such that the reciprocating internal combustion engine 32, the flanged connection 80 and the gearbox 36 form a common resilient mounting structure.

In an embodiment, the torsionally resilient coupling 46 is arranged between and connects the output device 60 (e.g., a flywheel) of the reciprocating internal combustion engine 32 and the gearbox input 62 (e.g., a gearbox input shaft) of the gearbox 36. Further, in an embodiment, the first connecting structure 12b may be further characterized to include a flywheel housing 82 connected to the reciprocating internal combustion engine 32 that contains the output device 60, and, the first connecting structure 12b may be further characterized to include a gearbox input housing 84 connected to the gearbox 36 that contains the gearbox input 62. In an embodiment, the housings 82, 84 may be flanged/connected to one another. In an embodiment, the torsionally resilient coupling 46 may be located within one of or both of the flywheel housing 82 and the gearbox input housing 84.

As indicated above, in an embodiment, the gearbox 36 is resiliently mounted with respect to the support frame 50. The resilient mounting of the gearbox 36 is permitted by way of one or more supports 86 connected to the support frame 50 and one or more resilient mounts 88 that connect the gearbox 36 to the one or more supports 86. In an embodiment, the one or more supports 86 may be attached to the support frame 50 by any desirable connection such as, for example, a welded connection. Further, in an embodiment, the one or more supports 86 may include one or more individual members, as illustrated, or, alternatively, one or more parallel elongated members that fulfill the function of both the one or more supports 86 and the one or more supports 52, and that are substantially equal to a geometry (e.g., a length) of the common structure formed by the gearbox 36, the flanged connection 80 and the reciprocating internal combustion engine 32.

Further, in an embodiment, it will be appreciated that the one or more supports 86 and resilient mounts 88 may be utilized concurrently with the one or more supports 52 and resilient mounts 54 to resiliently mount the gearbox 36 and the reciprocating internal combustion engine 32 with respect to the support frame 50. Even further, it will be appreciated that the one or more supports 86 and resilient mounts 88 may be characterized to include dissimilar geometries from the one or more supports 52 and resilient mounts 54 in order to accommodate the alignment of, for example, the output device 60 (e.g., a flywheel) of the reciprocating internal combustion engine 32 and, for example, the gearbox input 62 (e.g., a gearbox input shaft) of the gearbox 36. Yet even further, it will be appreciated that the resilient mounts 54, 88 may be characterized to include different stiffnesses due to different amounts of weight being imparted to the resilient mounts 54, 88 by, respectively, the reciprocating internal combustion engine 32 and the gearbox 36.

Regarding the Power Generation System 320

Figure 1D:
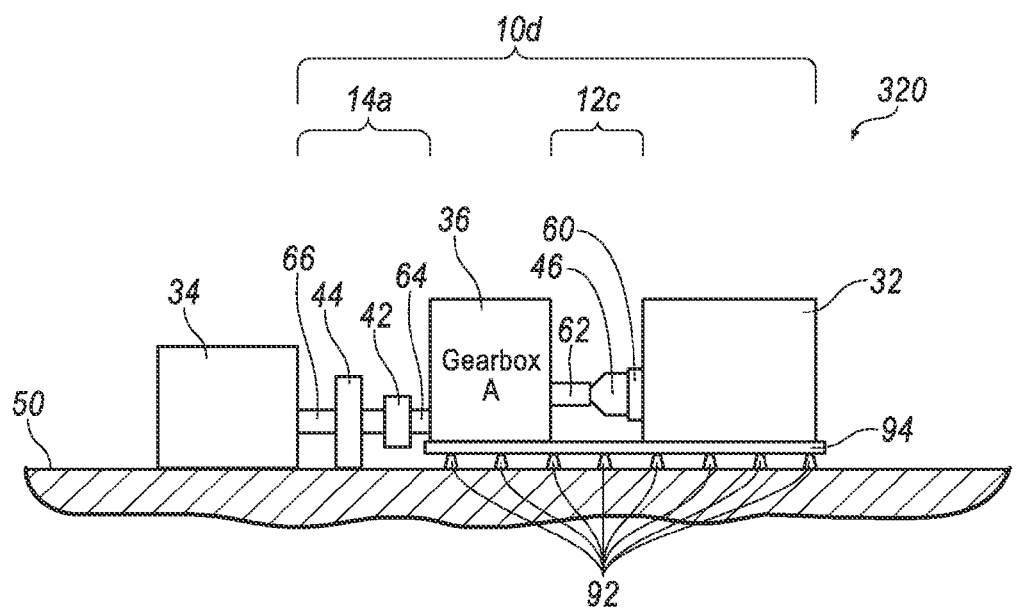
FIG. 1D is a schematic diagram of a power generation system in accordance with an embodiment of the invention.

Referring to FIG. 1D, a power generation system is shown generally at 320 having a repowered portion 10d in accordance with an embodiment of the invention. Comparatively, the repowered portion 10d is substantially similar to the repowered portion 10c shown in FIG. 1C except for a) the arrangement of the resilient mounting of the gearbox 36 and the reciprocating internal combustion engine 32 with respect to the support frame 50, and b) the arrangement of the first connecting structure, which is shown generally at 12c.

Firstly, in an embodiment, the gearbox 36 and reciprocating internal combustion engine 32 of FIG. 1D share and are connected into a common resilient mounting structure by a rigid and strong skid 94 as opposed to their sharing and being connected into a common resilient mounting structure by a flanged connection 80. Secondly, in an embodiment, the first connecting structure 12c is substantially similar to the first connecting structure 12a of FIGS. 1A, 1B except that the first misalignment coupling 40 may be omitted because both of the reciprocating internal combustion engine 32 and gearbox 36 are resiliently mounted.

In an embodiment, the skid 94 is connected to the support frame 50 by a plurality of resilient mounts 92. By arranging both of the gearbox 36 and the reciprocating internal combustion engine 32 on the skid 94, both of the gearbox 36 and the internal combustion engine 32 may be resiliently mounted with a common structure while also maintaining the alignment of, for example, the output device 60 of the reciprocating internal combustion engine 32 and the gearbox input 62 of the gearbox 36.

Regarding the Power Generation Systems 420, 520, 620, 720

Referring to FIGS. 2A-2D, power generation systems are shown respectively at 420, 520, 620, 720 each having a repowered portion 10e, 10f, 10g, 10h in accordance with an embodiment of the invention. In an embodiment, the power generation systems 420, 520, 620, 720 are respectively similar to the power generation systems 20, 120, 220, 320 of FIGS. 1A-1D with the exception of the design of the gearbox (i.e., "Gearbox B"), which is shown generally at 136 in each of FIGS. 2A-2D.

In an embodiment, "Gearbox B" is differentiated from the gearbox 36 (i.e., "Gearbox A") in that "Gearbox B" includes an integrated clutch, overrunning clutch, constant- or variable-fill fluid coupling or torque converter, which is shown generally at 96; it will be appreciated that reference numeral 96 may refer to any of the above-described components and that the invention is not limited to including a clutch, an overrunning clutch, constant- or variable-fill fluid coupling or torque converter at reference numeral 96. In an embodiment, the clutch, integrated overrunning clutch, constant- or variable-fill fluid coupling or torque converter 96 is utilized for selectively translating rotational movement during specific operating conditions (e.g. an idling condition) of the reciprocating internal combustion engine 32 when torque reversals of the output device 60 (e.g., a flywheel) of the reciprocating internal combustion engine 32 are likely to occur. Further, in an embodiment, the torsionally resilient coupling 46 of the repowered portion 10e, 10f, 10g, 10h (as well as the torsionally resilient coupling 46 of the repowered portion 10i, 10j, 10k described in the foregoing description) may be differentiated from the torsionally resilient coupling 46 of the repowered portion 10a, 10b, 10c, 10d in that the torsionally resilient coupling 46 of the repowered portion 10e, 10f, 10g, 10h (or of the repowered portion 10i, 10j, 10k described in the foregoing disclosure) includes a lower degree of torsional stiffness. Because of the arrangement of the internal clutch, overrunning clutch, constant- or variable-fill fluid coupling or torque converter 96 as a component of the "Gearbox B," the gears of "Gearbox B" may not need to be sized to accommodate torque reversals. However, it will be appreciated that "Gearbox B" may include gears with an increased ability to withstand whatever low-magnitude torque pulses may still be transmitted from the output device 60 of the reciprocating internal combustion engine 32 to the gears within the gearbox 136 by way of the torsionally resilient coupling 46 of the repowered portion 10e, 10f, 10g, 10h (or of the repowered portion 10i, 10j, 10k described in the foregoing disclosure) and the clutch, overrunning clutch, constant- or variable-fill fluid coupling or torque converter 96 throughout the range of operating conditions. Further, it will be appreciated that the torsionally resilient coupling 46 of the repowered portion 10e, 10f, 10g, 10h (or of the repowered portion 10i, 10j, 10k described in the foregoing disclosure) may be characterized as having a lower torsional stiffness than the torsionally resilient coupling 46 of the repowered portion 10a, 10b, 10c, 10d due to the clutch, overrunning clutch, constant- or variable-fill fluid coupling or torque converter 96 reducing the need for high torsional stiffness within the torsionally resilient coupling 46 to avoid damage being imparted to the torsionally resilient coupling 46 arising from extremely high-magnitude torque pulses during, for example, the starting of the reciprocating internal combustion engine 32.

Operationally, in an embodiment, '96' may include a clutch such that when the reciprocating internal combustion engine 32 is in an idle condition, the clutch 96 may be disengaged completely, or, alternatively, the applied pressure of the clutch 96 may be reduced. As such, the gearbox 136 may be permitted to continue to operate as the clutch 96 may allow for a controlled amount of slip when the reciprocating internal combustion engine 32 is idling; in an embodiment, the slipping may be controlled by a control system (not shown) that adjusts the reduced pressure applied by the clutch 96. Further, in an embodiment, the same method of allowing a controlled amount of slip within the clutch 96 may be used, in the example of a locomotive, during dynamic braking when the electrical converting device 34 may be required to rotate at a somewhat elevated speed to produce field current for the locomotive's traction motors (not shown), while the net power being transmitted through the power generation system remains low. Functionally, allowing the clutch 96 to slip during idle and dynamic braking may isolate the gears within the gearbox 136 from whatever low-magnitude torque reversals may be produced during idle and dynamic braking. Further, if, for example, '96' is a clutch, it will be appreciated that in some circumstances a small amount of power may still need to be transmitted to the electrical converting device 34 during conditions conducive to torque reversals; as such, by permitting the clutch 96 to slip rather than disengage, the clutch 96 may permit the electrical converting device 34 to receive the small amount of power from the reciprocating internal combustion engine 32. Such examples may include circumstances where the electrical converting device 34 is needed to power small auxiliary loads during idle, or, to provide a field current for exciting traction motors during dynamic braking. As such, by allowing the clutch 96 to slip, additional isolation is provided between the torque pulses of the reciprocating internal combustion engine 32 and the rotating mass of the electrical converting device 34. Further, in an embodiment, it will be appreciated that because "Gearbox B" includes the clutch 96, the gears may not need to be sized accordingly to accommodate torque reversal from the reciprocating internal combustion engine 32. Alternatively, the clutch 96 may be permitted to be disengaged while the reciprocating internal combustion engine 32 is being started and stopped while being engaged at all other times (i.e., no slipping), including during idle and dynamic braking. It will be appreciated that in this alternative, wherein the clutch 96 remains engaged, for example, during idle and dynamic braking, the gears may need to be sized accordingly to accommodate the low-magnitude torque reversals that may be present during idle and dynamic braking. Further, in an embodiment, the external clutch 196 may not be disengaged or limit the transfer of torque when the load exerted by the reciprocating internal combustion engine 32 decreases by an amount that produces low-magnitude torque reversals that the gears in "Gearbox C" may be able to withstand. For example, if the power generation system 820, 920, 1020 is utilized in a locomotive during dynamic braking, it may be desirable to allow the external clutch 196 to remain engaged, or, alternatively, to allow the transfer of torque. In another example, the external clutch 196 may remain engaged during idling of the reciprocating internal combustion engine 32, even if the reciprocating internal combustion engine 32 experiences some degree torque reversal. However, it will be appreciated that during some other operational events where one or more of the torque pulse and torque pulse reversal loads may be significantly increased (e.g., during start-up of the reciprocating internal combustion engine 32), the external clutch 196 may disengage or limit the transfer of torque from the reciprocating internal combustion engine 32.

If, for example, '96' includes an overrunning clutch, '96' would be automatically a) engaged whenever torque being transmitted from the reciprocating internal combustion engine 32 is positive and b) disengaged during brief moments when the torque from the reciprocating internal combustion engine 32 is negative; as such, because an overrunning clutch 96 does not slip, it would transmit the full magnitude of any positive torque pulses to the gears, even the extremely large pulses during engine start.

If, for example, '96' includes a constant- or variable-fill fluid coupling, '96' would always be slipping in order to protect the gears from damage arising from torque reversals; in an embodiment, the constant- or variable-fill fluid coupling 96 may include a lock-up clutch (not shown) for controlling and increasing the efficiency of the constant- or variable-fill fluid coupling 96.

If, for example, '96' includes a torque converter, '96' would allow its output torque to be higher than its input torque during high amounts of slip; in an embodiment, the torque converter 96 may include a stator (not shown), and, in an embodiment, may also include a lock-up clutch (not shown).

In an embodiment, "Gearbox B" may be characterized as a type of gearbox that is typically utilized in marine applications (i.e., gearboxes in marine application may include a clutch 96, or may include a constant- or variable-fill fluid coupling or torque converter 96 with some degree of slip). Functionally, the slipping of a constant- or variable-fill fluid coupling or torque converter 96 that does not include a lock-up clutch reduces the effective maximum rated speed of the reciprocating internal combustion engine 32 communicated to the gears within "Gearbox B." Thus, a lower effective maximum rated speed of the reciprocating internal combustion engine 32 may be communicated to the gears.

Further, in an embodiment, it will be appreciated that it may be advantageous to maintain a clutch 96 in a disengaged state, or, to maintain a constant- or variable-fill fluid coupling in an empty state during the starting/stopping of the reciprocating internal combustion engine 32, which may otherwise result in the most severe torque pulses. Further, it will be appreciated that there is not a need for any rotation of the electrical converting device 34 until after the reciprocating internal combustion engine 32 has achieved a stable idle speed. Yet even further, a reduced load would be placed on starter motors, batteries and the like if the electrical converting device 34 is permitted to remain stationary while the reciprocating internal combustion engine 32 is being started; it will be appreciated, however, that the reduced load is an additional benefit of keeping a clutch 96 disengaged or of keeping a variable-fill fluid coupling 96 empty during engine start and should not be construed as a mandatory configuration of an embodiment of the present invention.

Regarding the Power Generation Systems 820, 920, 1020

Figure 3A:
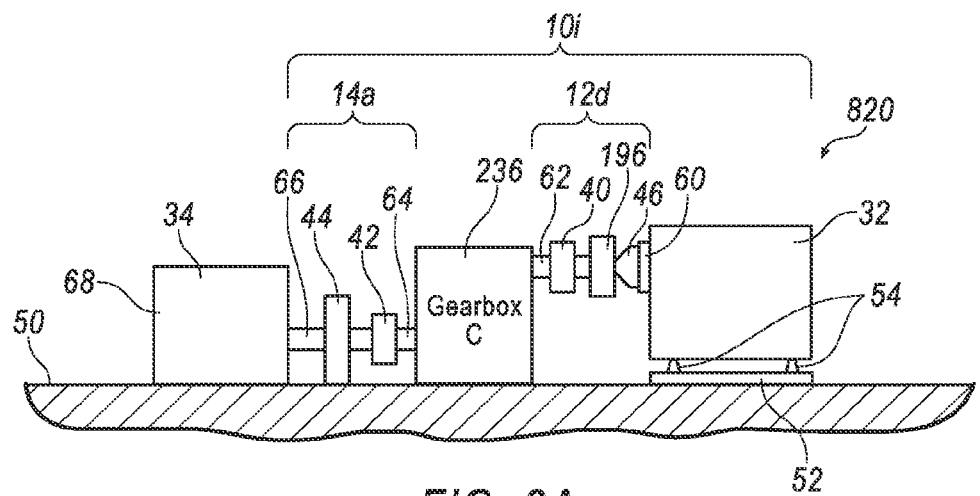
FIG. 3A is a schematic diagram of a power generation system in accordance with an embodiment of the invention.
Figure 3B:
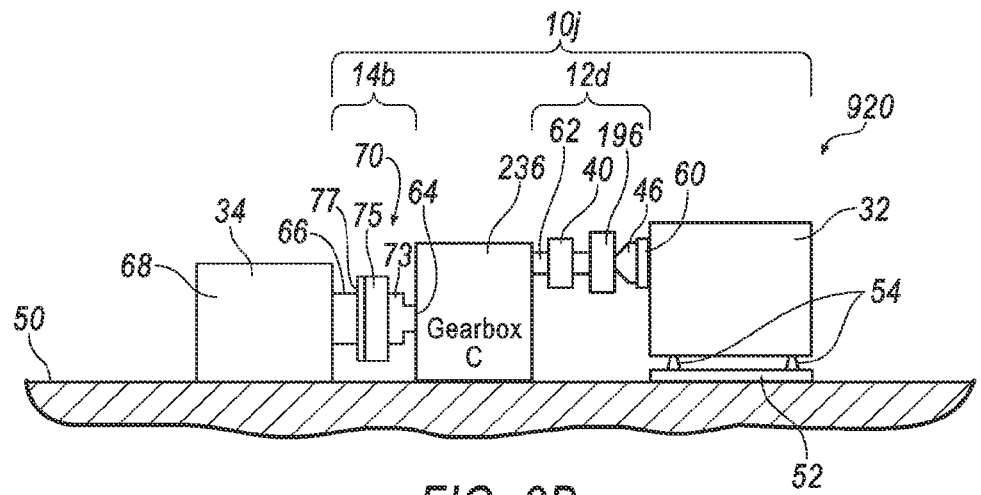
FIG. 3B is a schematic diagram of a power generation system in accordance with an embodiment of the invention.
Figure 3C:
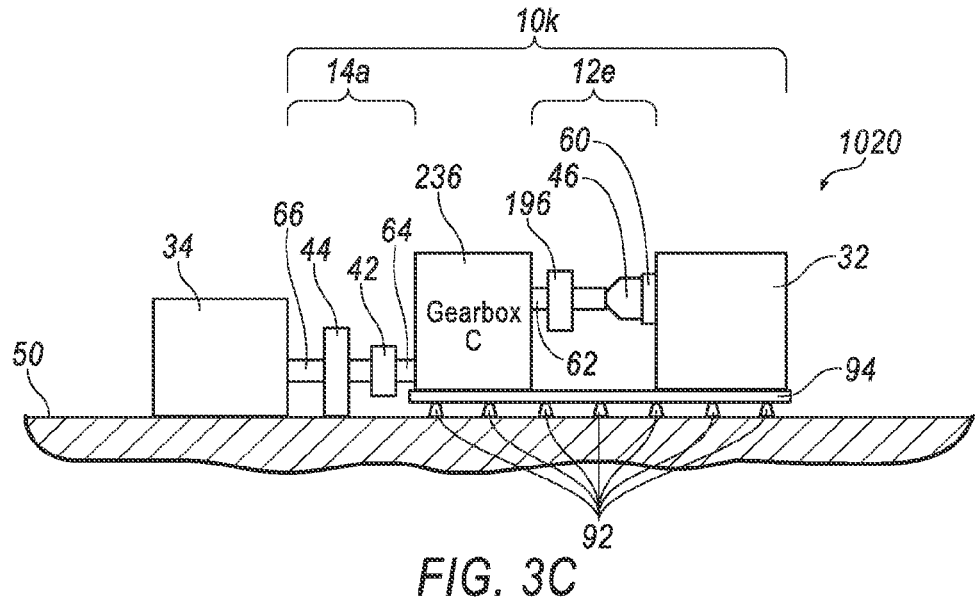
FIG. 3C is a schematic diagram of a power generation system in accordance with an embodiment of the invention.

Referring to FIGS. 3A-3C, power generation systems are shown respectively at 820, 920, 1020 each having a repowered portion 10i, 10j, 10k in accordance with an embodiment of the invention. In an embodiment, the power generation systems 820, 920, 1020 are respectively similar to the power generation systems 420, 520, 720 of FIGS. 2A, 2B and 2D with the exception of the design of the first connecting structure 12d (see FIGS. 3A-3B), 12e (see FIG. 3C). Further, the power generation systems 820, 920, 1020 are differentiated from the power generation systems 420, 520, 720 by way of the design of the gearbox (i.e., "Gearbox C"), which is shown generally at 236 in FIGS. 3A-3C.

In an embodiment, the first connecting structure 12d, 12e is differentiated from first connecting structure 12a, 12c by the inclusion of an external clutch, overrunning clutch, constant- or variable-fill fluid coupling or torque converter 196. Further, in an embodiment, the "Gearbox C" is differentiated from the "Gearbox B" by the lack of inclusion of an internal clutch, overrunning clutch, constant- or variable-fill fluid coupling or torque converter 96. In an embodiment, the external clutch, overrunning clutch, constant- or variable-fill fluid coupling or torque converter 196 may be included in the design of the first connecting structure 12d, 12e for the purpose of reducing the load on the gearbox input 62 of "Gearbox C."

In an embodiment, the first connecting structure 12d may be characterized by the external clutch, overrunning clutch, constant- or variable-fill fluid coupling or torque converter 196 being arranged between and connecting the torsionally resilient coupling 46 and the first misalignment coupling 40. In an alternative embodiment (not shown), the first connecting structure 12d may be characterized by the external clutch, overrunning clutch, constant- or variable-fill fluid coupling or torque converter 196 being arranged between and connecting the first misalignment coupling 40 and the gearbox input 62. In an embodiment, the first connecting structure 12e may be characterized by the external clutch, overrunning clutch, constant- or variable-fill fluid coupling or torque converter 196 being arranged between and connecting the torsionally resilient coupling 46 and the gearbox input 62 (e.g., a gearbox input shaft) of the gearbox 236.

In an embodiment, the clutch, external overrunning clutch, constant- or variable-fill fluid coupling or torque converter 196 is utilized for selectively translating rotational movement during specific operating conditions (e.g. an idling condition) of the reciprocating internal combustion engine 32 when torque reversals of the output device 60 (e.g., a flywheel) of the reciprocating internal combustion engine 32 are likely to occur. Because of the arrangement of the external clutch, overrunning clutch, constant- or variable-fill fluid coupling or torque converter 196 as a component of the first connecting structure 12d, 12e, the "Gearbox C" may not need to include an integrated clutch, overrunning clutch, constant- or variable-fill fluid coupling or torque converter 96 as shown and described above with respect to the "Gearbox B," and, also because of this arrangement the gears of "Gearbox C" may not need to be sized to accommodate torque reversals. However, it will be appreciated that "Gearbox C" may include gears with an increased ability to withstand whatever low-magnitude torque pulses may still be transmitted from the output device 60 of the reciprocating internal combustion engine 32 to the gears within the gearbox 236 by way of the torsionally resilient coupling 46 and through the clutch, overrunning clutch, constant- or variable-fill fluid coupling or torque converter 196 throughout the range of operating conditions.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:
1. A method, comprising the steps of:
providing a power generation system including a support frame and an originally-installed internal combustion engine connected to an electrical converting device;
removing the originally-installed internal combustion engine from the electrical converting device and the support frame; and repowering the power generation system by
    connecting a repowered portion to the electrical converting device, wherein the repowered portion includes
        a reciprocating internal combustion engine, and
        a gearbox, wherein the reciprocating internal combustion engine is connected to the gearbox by a first connecting structure, wherein the gearbox is connected to the electrical converting device by a second connecting structure.

2. The method according to claim 1, wherein the first connecting structure includes
    a misalignment coupling, and
    a torsionally resilient coupling connected to the misalignment coupling.

3. The method according to claim 2, wherein the first connecting structure further comprises
    an output device of the reciprocating internal combustion engine connected to one of the misalignment coupling and the torsionally resilient coupling, and
    a gearbox input of the gearbox connected to the other of the misalignment coupling and the torsionally resilient coupling.

4. The method according to claim 2, wherein the first connecting structure further comprises
    a clutch, overrunning clutch, constant- or variable-fill fluid coupling or torque converter, wherein the torsionally resilient coupling connected to one or more of the clutch, overrunning clutch, constant- or variable-fill fluid coupling or torque converter and the misalignment coupling.

5. The method according to claim 4, further comprising the step of
    utilizing the clutch, overrunning clutch, constant- or variable-fill fluid coupling or torque converter for selectively translating rotational movement produced by the reciprocating internal combustion engine to the electrical converting device by way of the gearbox.

6. The method according to claim 1, wherein the first connecting structure includes
    a flanged connection including a first portion extending from the reciprocating internal combustion engine and a second portion extending from the gearbox, wherein the first portion is flanged to the second portion, and
    a torsionally resilient coupling arranged within one or more of the first portion and the second portion.

7. The method according to claim 6, wherein the first portion is a flywheel housing, wherein the second portion is a gearbox input housing, wherein the torsionally resilient coupling is connected to
    an output device of the reciprocating internal combustion engine, wherein the output device is arranged within the flywheel housing, and wherein the torsionally resilient coupling is also connected to
    a gearbox input of the gearbox, wherein the gearbox input is arranged within the gearbox input housing.

8. The method according to claim 1, wherein the first connecting structure further comprises
    a torsionally resilient coupling,
    an output device of the reciprocating internal combustion engine connected to the torsionally resilient coupling, and
    a gearbox input of the gearbox connected to the torsionally resilient coupling.

9. The method according to claim 8, wherein the first connecting structure includes
    a clutch, overrunning clutch, constant- or variable-fill fluid coupling or torque converter coupled to the gearbox input.

10. The method according to claim 9, further comprising the step of
    utilizing the clutch, overrunning clutch, constant- or variable-fill fluid coupling or torque converter for selectively translating rotational movement produced by the reciprocating internal combustion engine to the electrical converting device by way of the gearbox.

11. The method according to claim 1, wherein the second connecting structure includes
    a misalignment coupling, wherein the misalignment coupling is connected to
        a gearbox output of the gearbox, wherein the misalignment coupling is also connected to
        an input of the electrical converting device.

12. The method according to claim 1, wherein the second connecting structure includes
    a direct power transmitting connection including
        a gearbox output,
        a rigid circular disk connected to the gearbox output, and
        a flexible circular disk connected to the rigid circular disk, wherein the electrical converting device includes a rotor having an input that is connected to the flexible circular disk.

13. The method according to claim 1, further comprising the step of:
    utilizing the gearbox for matching a maximum rated speed of the reciprocating internal combustion engine to a maximum rated speed of the electrical converting device.

14. The method according to claim 1, wherein the gearbox includes
    an integrated clutch, overrunning clutch, constant- or variable-fill fluid coupling or torque converter, wherein the method further comprises the step of:
        utilizing the integrated clutch, overrunning clutch, constant- or variable-fill fluid coupling or torque converter for selectively translating rotational movement produced by the reciprocating internal combustion engine to the electrical converting device by way of the gearbox.

15. The method according to claim 1, wherein the electrical converting device, the reciprocating internal combustion engine and the gearbox are connected to the support frame of an industrial vehicle.

16. The method according to claim 15, further comprising
    a resilient mounting portion that connects one or more of the reciprocating internal combustion engine and the gearbox to the support frame of the industrial vehicle.

17. The method according to claim 16, further comprising the step of:
    utilizing the resilient mounting portion for resiliently mounting one or more of the reciprocating internal combustion engine and the gearbox to the support frame of the industrial vehicle.

18. The method according to claim 16, further comprising the step of:
    utilizing the resilient mounting portion for elevating one or more of the reciprocating internal combustion engine and gearbox away from the support frame of the industrial vehicle for aligning the reciprocating internal combustion engine with the gearbox with respect to an alignment of the gearbox with the electrical converting device.

19. A method, comprising the steps of:
providing a power generation system including a support frame and an originally-installed internal combustion engine connected to an electrical converting device;
removing the originally-installed internal combustion engine from: the electrical converting device and the support frame; and
repowering the power generation system by
connecting a repowered portion to the electrical converting device, wherein the repowered portion includes
a reciprocating internal combustion engine, and
a gearbox, wherein the reciprocating internal combustion engine is connected to the gearbox by a first connecting structure, wherein the gearbox is connected to the electrical converting device by a second connecting structure, wherein one or more of the first connecting structure and the second connecting structure includes a misalignment coupling.

20. The method according to claim 19, wherein each of the first connecting structure and the second connecting structure includes a misalignment coupling, wherein the first connecting structure includes
a first misalignment coupling, wherein the second connecting structure includes
a second misalignment coupling.

21. The method according to claim 19, wherein only the first connecting structure includes the misalignment coupling.

22. The method according to claim 19, wherein only the second connecting structure includes the misalignment coupling.

23. The method according to claim 19, wherein the first connecting structure includes
a torsionally resilient coupling connected to the misalignment coupling.

24. The power generation system according to claim 23, wherein the first connecting structure further comprises
an output device of the reciprocating internal combustion engine connected to one of the misalignment coupling and the torsionally resilient coupling, and
a gearbox input of the gearbox connected to the other of the misalignment coupling and the torsionally resilient coupling.

25. The method according to claim 23, wherein the first connecting structure further comprises
a clutch, overrunning clutch, constant- or variable-fill fluid coupling or torque converter, wherein the torsionally resilient coupling connected to one or more of the clutch, overrunning clutch, constant- or variable-fill fluid coupling or torque converter and the misalignment coupling.

26. The method according to claim 25, further comprising the step of:
utilizing the clutch, overrunning clutch, constant- or variable-fill fluid coupling or torque converter for selectively translating rotational movement produced by the reciprocating internal combustion engine to the electrical converting device by way of the gearbox.

27. The method according to claim 20, wherein the second misalignment coupling is connected to a gearbox output of the gearbox, wherein the second misalignment coupling is also connected to an input of the electrical converting device.

28. The method according to claim 19, further comprising the step of:
utilizing the gearbox for matching a maximum rated speed of the reciprocating internal combustion engine to a maximum rated speed of the electrical converting device.

29. The method according to claim 19, wherein the gearbox includes
an integrated clutch, overrunning clutch, constant- or variable-fill fluid coupling or torque converter, wherein the method further comprises the step of:
utilizing the integrated clutch, overrunning clutch, constant- or variable-fill fluid coupling or torque converter for selectively translating rotational movement produced by the reciprocating internal combustion engine to the electrical converting device by way of the gearbox.

30. The method according to claim 19, wherein the electrical converting device, the reciprocating internal combustion engine and the gearbox are connected to a support frame of an industrial vehicle.

31. A method, comprising the steps of:
providing a power generation system including a support frame and an originally-installed internal combustion engine connected to an electrical converting device;
removing the originally-installed internal combustion engine from: the electrical converting device and the support frame; and
repowering the power generation system by
connecting a repowered portion to the electrical converting device, wherein the repowered portion includes
a reciprocating internal combustion engine, and
a gearbox, wherein the reciprocating internal combustion engine is connected to the gearbox by a first connecting structure having a torsionally resilient coupling, wherein the gearbox is connected to the electrical converting device by a second connecting structure.

32. The method according to claim 31, wherein the first connecting structure includes
a misalignment coupling, wherein the torsionally resilient coupling is connected to the misalignment coupling.

33. The method according to claim 32, wherein the first connecting structure further comprises
an output device of the reciprocating internal combustion engine connected to one of the misalignment coupling and the torsionally resilient coupling, and
a gearbox input of the gearbox connected to the other of the misalignment coupling and the torsionally resilient coupling.

34. The method according to claim 32, wherein the first connecting structure further comprises
a clutch, overrunning clutch, constant- or variable-fill fluid coupling or torque converter connecting the misalignment coupling and one of the torsionally resilient coupling and the gearbox input of the gearbox.

35. The method according to claim 34, further comprising the step of:
utilizing the clutch, overrunning clutch, constant- or variable-fill fluid coupling or torque converter for selectively translating rotational movement produced by the reciprocating internal combustion engine to the electrical converting device by way of the gearbox.

36. The method according to claim 31, wherein the first connecting structure includes
a flanged connection including a first portion extending from the reciprocating internal combustion engine and a second portion extending from the gearbox, wherein the first portion is flanged to the second portion, wherein the torsionally resilient coupling arranged within one or more of the first portion and the second portion.

37. The method according to claim 36, wherein the first portion is a flywheel housing, wherein the second portion is a gearbox input housing, wherein the torsionally resilient coupling is connected to
an output device of the reciprocating internal combustion engine, wherein the output device is arranged within the flywheel housing, and wherein the torsionally resilient coupling is also connected to
a gearbox input of the gearbox, wherein the gearbox input is arranged within the gearbox input housing.

38. The method according to claim 31, wherein the first connecting structure includes
a clutch, overrunning clutch, constant- or variable-fill fluid coupling or torque converter coupled to a gearbox input of the gearbox.

39. The method according to claim 38, further comprising the step of:
utilizing the clutch, overrunning clutch, constant- or variable-fill fluid coupling or torque converter for selectively translating rotational movement produced by the reciprocating internal combustion engine to the electrical converting device by way of the gearbox.

40. The method according to claim 31, wherein the second connecting structure includes
a misalignment coupling, wherein the misalignment coupling is connected to
a gearbox output of the gearbox, wherein the misalignment coupling is also connected to
an input of the electrical converting device.

41. The method according to claim 31, wherein the second connecting structure includes
a direct power transmitting connection including
a gearbox output,
a rigid circular disk connected to the gearbox output, and
a flexible circular disk connected to the rigid circular disk, wherein the electrical converting device includes a rotor having an input that is connected to the flexible circular disk.

42. The method according to claim 31, further comprising the step of:
utilizing the gearbox for matching a maximum rated speed of the reciprocating internal combustion engine to a maximum rated speed of the electrical converting device.

43. The method according to claim 31, wherein the gearbox includes
an integrated clutch, overrunning clutch, constant- or variable-fill fluid coupling or torque converter, wherein the method further comprises the step of:
utilizing the integrated clutch, overrunning clutch, constant- or variable-fill fluid coupling or torque converter for selectively translating rotational movement produced by the reciprocating internal combustion engine to the electrical converting device by way of the gearbox.

44. The method according to claim 31, wherein the electrical converting device, the reciprocating internal combustion engine and the gearbox are connected to a support frame of an industrial vehicle.

45. The method according to claim 44, further comprising
a resilient mounting portion that connects one or more of the reciprocating internal combustion engine and the gearbox to the support frame of the industrial vehicle.

46. The method according to claim 45, further comprising the step of:
utilizing the resilient mounting portion for resiliently mounting one or more of the reciprocating internal combustion engine and the gearbox to the support frame of the industrial vehicle.

47. The method according to claim 45, further comprising the step of:
utilizing the resilient mounting portion for elevating one or more of the reciprocating internal combustion engine and gearbox away from the support frame of the industrial vehicle for
aligning the reciprocating internal combustion engine with the gearbox with respect to an alignment of the gearbox with the electrical converting device.

* * * * *